March 19, 1968 E. R. BUEHLER 3,374,438
STOP-ON SIGNAL TUNER FOR COMBINED AM-FM RECEIVERS
Filed Sept. 17, 1964
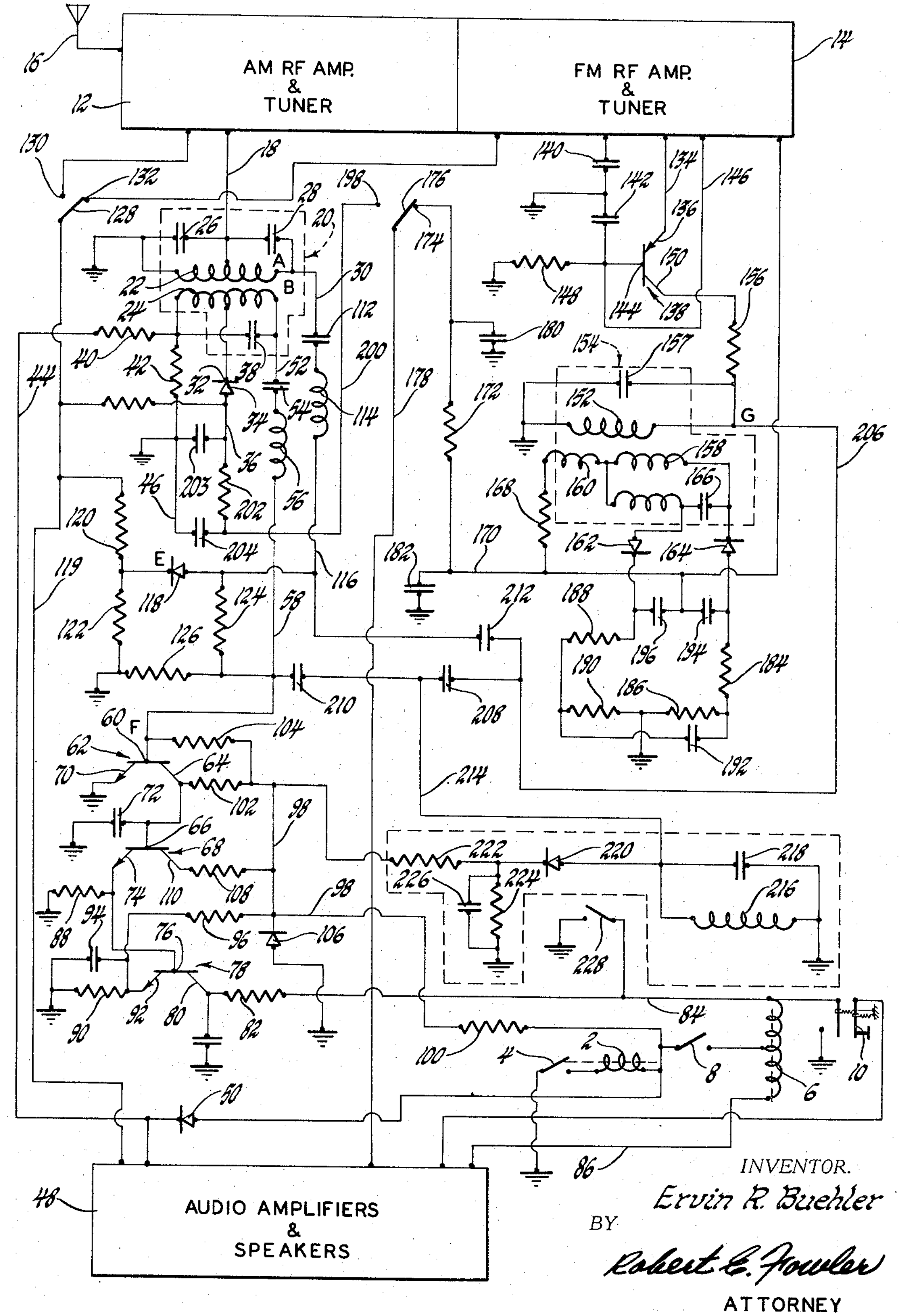
INVENTOR.
Ervin R. Buehler
BY
Robert E. Fowler
ATTORNEY United States Patent Office 3,374,438

Patented Mar. 19, 1968

3,374,438

STOP-ON SIGNAL TUNER FOR COMBINED AM-FM RECEIVERS

Ervin R. Buehler, Galveston, Ind., assignor to General Motors Corporation, Detroit, Mich., a corporation of Delaware Filed Sept. 17, 1964, Ser. No. 397,147
7 Claims. (Cl. 325—470)

ABSTRACT OF THE DISCLOSURE

A stop-on station system for combined AM-FM receivers having signal seeking tuners. Signal to stop indexing is modified by a delay signal to continue indexing to middle of incoming signal band. Signal transfer circuit of system is detuned by a capacitive diode during standby to prevent distortion.

*Summary of the invention*

This invention relates to radio receivers of the type which index and stop-on-station automatically upon the receipt of an incoming signal as the tuner scans the frequency spectrum. More specifically it relates to signal seeking tuner means associated with radio receivers that are capable of receiving and translating both amplitude and frequency modulated carrier waves or AM-FM receivers.

Signal seeking tuned AM receivers have been in commercial use for an extended period and the public are familiar with their construction and operation. However, when it is desired to utilize the same signal indexing means for both AM and FM incoming signals problems arise.

It is an object in making this invention to provide a combination AM-FM signal tuned radio receiver.

It is a further object in making this invention to provide a fully transistorized AM-FM signal tuned radio receiver.

It is a still further object to provide an AM-FM signal seeking tuned receiver having sufficient stopping sensitivity which will not reflect impedance into the FM amplifier to de-tune the same in the listening phase of operation.

With these and other objects in view which will become apparent as the specification proceeds, my invention will be best understod by reference to the following specification and claims and the illustrations in the accompanying drawings, in which:

The figure is a circuit diagram, partly in block form of an AM-FM signal seeking tuned radio receiver embodying my invention.

In general, a signal intercepted by an antenna and applied to the radio receiver under consideration may be either an AM carrier in the frequency band from 550 to 1600 kc. or an FM signal in the frequency band from 88 to 108 mc. It uses permeability tuning to tune either band, the two sets of cores being carried by a common member for tuning.

The movable tuning mechanism is driven in a direction to tune the receiver over the frequency bands for which the set is designed by a loaded spring which, when it has traversed the band, is re-cocked to its opposite extremity by a solenoid energized by a limit switch. During the tuning scanning cycle, if a signal of sufficient strength is received, a control relay is energized which drops into a flywheel in the driving chain to stop the tuner on station. Such a tuning and scaning mechanism is shown in the patent to Schwarz et al. 2,701,330 dated Feb. 1, 1955. In the type of tuner shown in this patent the operator may cause the tuner to scan by depressing a bar 142 which energizes a control relay 138. The energization of this relay attracts an armature 134 causing it to move its detent end out of engagement with the fly fan governor and the spring drive can then cause the tuner to proceed across the band. Upon the receipt of an incoming signal the relay 138 is de-energized, the pivoted arm 134 drops its detent end into engagement with the fly fan governor 58 and the set is indexed on that station. There is also provided a recocking solenoid 112 which, when the tuner reaches one extremity of travel to operate a limit switch, is energized and will re-cock the spring and move the tuner to the opposite limit position where it may again begin its scanning action.

Referring now more particularly to the figure of the drawings, the basic operating mechanism is of the above described type. There is provided a solenoid 2 for drive spring re-cocking purposes which is energized by movement of a limit switch 4 closed upon the tuner reaching one extremity of its travel. There is also provided a signal control relay coil 6 which is energized during scanning portions of the cycle and de-energized when the set becomes indexed on station. This relay actuates a holding switch 8 to maintain it energized after it has been initially energized to start seeking by the closure of the original starting switch 10 which is a spring biased switch, only momentarily closed by pressure from the operator and opens as soon as the pressure thereon is released.

Since the current invention pertains only to that portion of the circuit having to do with the signal seeking indexing and stopping, only that portion of the circuit is shown in detail. The set, however, includes an AM-RF section and tuner 12 shown in block diagram and an FM-RF section and tuner 14 both of which are connected to a common antenna 16. The incoming signals of either type modulation are fed into these sections commonly and are switched for either type of reception depending upon the position of a band switch, only portions of which are shown. The AM-RF section includes at least one section of intermediate frequency amplification and this feeds out on line 18 to apply the AM-IF signal to a last IF-AM amplifier stage which includes transformer 20 having primary 22 and secondary 24. The primary winding is center tapped and incoming line 18 is connected to said center tap. A condenser 26 is connected between said line 18 and one terminal of the primary which is grounded and a second condenser 28 is connected between line 18 and the other terminal of the primary which is connected to line 30 to tune the primary winding. The secondary winding 24 has its center tap connected to the cathode 32 of a diode whose anode 34 is connected to a line 36. A condenser 38 is connected across the secondary winding to tune the same to the intermediate frequency. One terminal of the secondary winding is connected to a point intermediate two resistors 40 and 42, the remaining terminal of resistor 40 being connected to line 44 and that of resistor 42 being connected to line 46. Line 44 extends directly to the audio amplifier and speaker section 48 shown by block diagram. A muting diode 50 is connected between line 44 and the recocking solenoid 2. An audio signal normally received by the AM-RF amplifier 12 is fed through line 200, through switch 176 and line 178 to the audio amplifier 48 for listening.

There are two signals produced by this IF amplifier stage transformer 20 which are used for indexing purposes. One is taken from the primary winding at point A and may be referred to as a delaying or restraining signal through line 30. The second is an actuating signal which is taken from one end of the secondary winding at point B through line 52 and thence through the condenser 54 and RF choke 56 to line 58. This actuating signal is fed directly into the base electrode 60 of transistor 62 identified as a detector at point F. The collector 64 of transistor 62 is connected directly to the base 66 of the next transistor 68 which is a DC amplifier stage. Emitter 70 of transistor 62 is grounded. A condenser 72 is connected between base electrode 66 and ground in order to act as a high frequency bypass. The next stage is connected as an emitter follower circuit and emitter 74 of transistor 68 is connected directly to base 76 of the last transistor 78 which is the relay control transistor and in series with the relay winding. This last transistor 78 has its collector electrode 80 connected through resistor 82 and line 84 to one end of winding 6 of the control relay, the other terminal of which is connected through line 86 into the audio amplifier and speaker section 48 where it is provided with electrical power from the source. Thus when transistor 78 conducts relay 6 will be energized.

Completing the biasing and filtering circuitry associated with the three stages of the trigger control circuit, a biasing resistor 88 is connected between the emitter 74 and ground. A further biasing resistor 90 is connected between the emitter electrode 92 of transistor 78 and ground and a bypass condenser 94 is connected in shunt with the resistance 90. A resistor 96 is connected between the emitter 92 and line 98 which extends from one terminal of dropping resistor 100 to one terminal of biasing resistor 102 and also to one terminal of resistor 104. The opposite terminal of resistance 102 is connected to collector 64 to provide electrical power for this transistor and the other terminal of resistor 104 is connected to the base electrode 60 of the same transistor. A diode 106 is connected between line 98 and ground and acts to regulate the voltage on this line. A further biasing resistor 108 is connected between power line 98 and collector 110 of transistor 68. As previously mentioned there are two trigger control signals derived from the last AM-IF amplifier stage transformer 20. One is an actuating signal through the line 58 and the second is a restraining or delay through line 30 and thence through coupling condenser 112 and choke 114 to line 116. A delay diode 118 is connected between line 116 and line 119 by a center tap in a voltage divider consisting of a pair of resistances 120 and 122 connected between line 119 and ground. A second voltage divider is formed of two resistances 124 and 126 connected between line 116 and ground. Line 119 is connected back directly to the audio amplifier and speaker section and provides power.

In describing the operation of the signal seeking portion as controlled by the AM signal only, the operator first depresses the switch 10 to close an energizing circuit through the line 86, relay coil 6, switch 10 to ground. A contact of switch 10 is also connected to the audio section 48 so that depression of the switch silences the audio section to prevent audible amplification of the noise caused by the consequent operations. With the relay coil 6 energized, a holding contact 8 actuated thereby is closed to maintain the switch energized. This operates to pick up the detent from some portion of the operating mechanism and the tuner scans as in the Schwarz, et al. patent. The closure of switch 8 also applies power to the line 98 and energizes the transistors 62, 68, 78. With no signal in the RF amplifier, collector current through the transistor 62 is cut off due to the potential on the base 60 and it is non-conductive. This holds the potential of the base 66 of the second stage 68 conductive which in turn maintains transistor 78 in conductive condition so that relay coil 6 remains energized. As the set tunes into a station carrier and a signal appears in the last IF stage 20 it will be on both the primary and secondary windings, and will have different envelopes. The signal present at point B, which is that on the secondary winding, is coupled through capacitor 54 and RF choke 56 and applied to the base 60 of transistor 62. This signal changes the bias on transistor 62 which has been cut off and collector current in this detector transistor begins to flow through resistance 102 if the signal is of sufficient amplitude. This increase in current will only occur when the tuner mechanism is properly centrally accurately positioned with respect to the carrier and maximum signal is obtained. To assure this condition regardless of the carrier strength of the incoming AM signal, a delay voltage is developed on the primary 22 of the transformer 20 and appears at point A. This delay voltage is coupled through a series capacitor 112 and choke 114 and appears on line 116 in similar manner to the actuating signal. This signal is applied to the delay diode rectifier 118 and the resultant DC voltage derived therefrom is applied to line 58 with the proper polarity to delay or restrain the actuating voltage through resistance 124. This delays or restrains the flow of collector current through resistor 102 until the signal is properly centered within the band. At this point the amplitude of the signal derived from point B is sufficient to overcome the delay bias provided from point A causing the collector current to flow.

This current results in an increased voltage drop across resistance 102 which reduces the bias at collector 64 and base 66 cutting down the current through the DC amplifier transistor 68 which in turn lowers the bias on the base 76 of the relay control transistor 78. This reduction in current flow through transistor 78 reduces the flow through the relay winding 6 causing it to drop out and index on station. The capacitor 72 connected from collector 64 to ground filters off the IF signal and prevents its passage through the following stages of transistors 68 and 78 and assists in the shaping of the DC pulse to control the relay 6. Thus the system operates for normal indexing on AM operation. The switch 128 whose movable armature is connected to line 119 is a portion of the band switch utilized in converting the receiver from AM to FM operation. It is adapted to engage two stationary contacts 130 and 132. In the position shown it is adapted for FM reception in contact with stationary contact 132. However, if it is moved to the opposite position in contact with stationary contact 130 it will place the system in condition for AM operation which has been discussed.

Referring now to the portion utilized for FM reception and tuning, the FM-RF amplifier and tuner section 14 provides a signal on line 134 which is connected to the emitter 136 of transistor 138. This is the last IF amplifier stage and feeds into the ratio detector for the FM signal. Also leading from the FM tuner is a second line through condenser 140 in series with a second condenser 142 which is connected to the base electrode 144 of transistor 138. A source of electrical power providing the proper bias to the base is connected through line 146 from the tuner section 14 and thence to ground through biasing resistor 148. This provides a proper potential to the base electrode. The output from this last IF amplifier stage is conducted from the collector electrode 150 into the primary winding 152 of the coupling transformer 154 through a limiting resistor 156. Condenser 157 is connected in shunt to the winding 152 and tunes the same to the intermediate frequency of 10.7 mc. for FM reception. The secondary winding 158 is tapped with one terminal connected to one diode 162 of the ratio detector circuit. The other end of secondary winding 158 is connected to another diode 164. The diodes are connected in inverse relation as shown. A condenser 166 is connected across the diodes on the transformer side. The center terminal of secondary winding 158 is connected to coil 160. The opposite end of coil 160 is connected to resistor 168 to line 170 to provide FM audio signal output and automatic frequency control for the FM tuner. This line is connected through de-emphasis resistor 172 to stationary contact 174 of a switch whose movable armature 176 is connected through conductor 178 directly to the audio amplifiers and speakers 48. Thus when the switch is in the position shown the output of the ratio detector, the FM audio signal is connected directly to the audio amplifiers for amplification and application to the speakers. A bypass filter condenser 180 is connected between contact 174 and ground and a second condenser 182 between line 170 and ground. The diode 164 of the ratio detector is connected through two series resistors 184 and 186 to ground and diode 162 in a similar manner is connected through resistors 188 and 190 to ground. A condenser 192 is connected across the two resistors 186 and 190. A pair of condensers 194 and 196 are connected in series across the diodes 162 and 164. These elements comprise the ratio detector, the output of which is taken from a central point between condensers 194 and 196 which is connected directly to line 170.

The movable switch arm 176 is a portion of the band switch and when in the position shown places the receiver in condition for receiving and detecting FM signals. When it is moved to the opposite position in contact with stationary contact 198 it places the receiver in condition for AM reception. Contact 198 is connected through line 200 to a point intermediate resistor 202 and a condenser 204. Resistor 202 is likewise connected to line 36 in the output of the AM–IF system and condenser 203 connected to line 46 in that network. The line 200 carries the AM audio output which is to be applied to the audio amplifiers and speakers.

The FM signal to be used for automatic signal stopping-on-station selection and its associated delay signal is derived from the primary winding 152 of the FM–IF transformer. This signal appears on line 206 which is connected to one end of the primary winding 152 and extends to a first coupling condenser 208 and then on to a second condenser 210 connected in series therewith whose remote terminal is connected to line 58 which is the input line to the base 60 of transistor 62 of the trigger control circuit. Line 206 is also connected to a coupling condenser 212 in turn connected to the delay diode 218 previously described. A point intermediate the two capacitors 208 and 210 is connected through line 214 to a tuned circuit consisting of an inductance 216 having in shunt therewith a condenser 218 the opposite ends of which are grounded. The resonant frequency of this tuned circuit is controlled by a capacitative diode 220 connected to line 214. The diode is also connected through a resistor 222 with the network of detector transistor 62 of the trigger circuit. Resistance 224 is connected between the capacitative diode and ground and has a condenser 226 in shunt therewith for filter purposes.

In the operation of this system for stopping-on-station for FM signal reception, the band switch including movable arms 128 and 176 is first placed in the FM position which is the position shown. The operator then depresses switch 10 or in the alternative may depress a foot switch 228 to complete an energizing circuit for the relay coil 6. Once this circuit is completed, relay coil 6 is energized through an obvious circuit and closes a holding contact 8. Either switch 10 or 228 may then be released and the relay coil will remain energized. This picks up the detent and allows the tuning mechanism to operate to scan the FM band. As long as no signal is intercepted the tuner will continue to move. However, when the tuner moves into a station and a signal appears at the output of the last FM–IF amplifier stage at point G this produces a signal at point F, or the base 60 of the first transistor of the trigger system. At the same time the signal in the primary 152 provides a delay signal voltage at the delay diode E (118) in the same manner as it did previously with AM reception and as the station comes into tune the delay voltage applied to line 58 through this channel will be sufficient to hold off the operation of the trigger system to cut off transistor 78 until the center of the resonant channel is reached. This follows the same manner as that described with regard to AM reception.

However, since the trigger circuit is conductively coupled to the last FM–IF transformer with the aid of the tuned circuit 216–218 tuned to the IF frequency to increase the strength of the signal applied for stopping purposes and make it more accurate, it is, of course, still conductively connected during listening periods. This may cause undesirable distortion during the latter. In order to avoid this distortion means are provided to de-tune the circuit 216–218 from the intermediate frequency during listening periods. The resonance of the tuned circuit 216–218 is controlled by the capacity of the diode 220 connected thereto during search to provide a low capacity of fixed value causing resonance at 10.7 mc. This bias is removed during listening conditions by the change in voltage on said diode due to the change in the voltage on line 98. This produces sufficient capacity change to de-tune the resonant circuit 216–218 and, therefore, remove the possibility of distortion in the last FM–IF transformer during listening periods. The two resistors 222 and 224 and capacitor 226 associated with the diode 220 provide the necessary potential and AC bypass.

It will thus be evident that I have provided a completely transistorized AM–FM signal seeking receiver which operates satisfactorily and does not introduce unwanted distortion into the system during listening periods.

What is claimed is:

1. In combination with a radio receiver having radio and intermediate frequency amplifying means, movable means for tuning the receiver over a predetermined band of frequencies, motor means for driving said movable means, relay controlled means associated with said movable means for tuning the receiver for stopping the same, and a trigger circuit connected to said relay controlled means to actuate the same upon receipt of a stopping pulse; an improvement comprising a circuit tuned to the intermediate frequency of the receiver and connected to the output of the intermediate frequency amplifying means, a conductive connection from said circuit tuned to said intermediate frequency to said trigger circuit to apply an indexing signal to said trigger circuit when a stopping pulse is generated in said circuit tuned to the intermediate frequency, a second circuit tuned to said intermediate frequency connected to said conductive connection between the first circuit tuned to the intermediate frequency and the trigger circuit to assist in producing a larger indexing signal at the trigger circuit, and means connected to the second circuit tuned to the intermediate frequency to de-tune that circuit from the intermediate frequency when a stopping signal is present and a station tuned in to avoid distortion in the first circuit tuned to intermediate frequency.

2. In combination with an FM radio receiver having power driving means for tuning said receiver over a predetermined band; indexing and stopping means for said power driving means to stop the same upon receipt of an incoming signal including, a first circuit tuned to the intermediate frequency of the receiver in which a signal is developed as the receiver is tuned to a station, relay control means for the power driving means, means for connecting said first circuit tuned to said intermediate frequency and said relay control means to apply a signal to the relay control means to stop the means for tuning when a station is tuned in, a second resonant circuit tuned to the intermediate frequency connected to the means connecting the first circuit tuned to the intermediate frequency and the relay control means to strengthen the signal applied to the latter, and means for de-tuning the second resonant circuit when the tuner is on station to avoid distortion connected to the second resonant circuit.

3. In a radio receiver for the reception of FM signals having movable tuning means for tuning the receiver over a predetermined band of frequencies and power means for driving said movable tuning means for scanning said band; means for indexing said tuning means upon receipt of an incoming signal of sufficient listenable level comprising relay control means for the power means, a triggering circuit connected to the relay control means to determine the energization thereof, intermediate frequency amplifying means in the receiver including a tuned circuit adjusted to the intermediate frequency and in which a stopping signal is developed as the tuning means is moved into a carrier signal, conductive means connecting said tuned circuit with the triggering circuit to control the same, a second tuned circuit tuned to the same frequency to assist the stopping signal and provide ample stopping energy, and means connected to the second tuned circuit to de-tune the same when on station so that it will not interfere with the first tuned circuit and introduce distortion for listening.

4. In an FM radio receiver having radio frequency and intermediate frequency amplifiers and motor driven tuning means for tuning the same over a predetermined band of frequencies; relay controlled stopping means for indexing said tuning means upon receipt of an incoming signal, a multi-stage transistorized trigger circuit connected to the relay controlled stopping means to determine the energization thereof, an IF transformer in the intermediate frequency amplifier in which a stopping signal is generated when the receiver is tuned into a station carrier, said IF transformer being tuned to the IF frequency, conductive means interconnecting the IF transformer and the transistorized trigger circuit to apply a stopping signal from the IF transformer to the transistorized trigger circuit to operate the relay controlled stopping means, a tuned circuit connected to the conductive means and tuned to the intermediate frequency to assist in transfer of the signal, a capacitative diode connected to the tuned circuit and to the transistorized trigger circuit for bias which changes its value as the transistorized trigger circuit is actuated by an incoming signal to detune the tuned circuit so that it will not cause distortion on listening.

5. In an FM radio receiver having radio frequency and intermediate frequency amplifiers and motor driven tuning means for tuning the same over a predetermined band of frequencies; relay controlled stopping means for indexing said tuning means upon receipt of an incoming signal, a multi-stage transistorized trigger circuit connected to the relay controlled stopping means to determine the energization thereof, an IF transformer in the intermediate frequency amplifier in which a stopping signal is generated when the receiver is tuned into a station carrier, said IF transformer being tuned to the IF conductive means interconnecting the IF transformer and the transistorized trigger circuit to apply a stopping signal from the IF transformer to the transistorized trigger circuit to operate the relay controlled stopping means, a delay circuit connected between the IF transformer and the transistorized trigger circuit to apply a delaying voltage to the trigger circuit until the station is acurately tuned in, a tuned circuit connected to the conductive means and tuned to the intermediate frequency to assist in transfer of the signal, a capacitative diode connected to the tuned circuit and to the transistorized trigger circuit for bias which changes its value as the transistorized trigger circuit is actuated by an incoming signal to detune the tuned circuit so that it will not cause distortion on listening.

6. In an AM-FM radio receiver having an AM-RF amplifier and tuner for receiving AM signals over a predetermined band of frequencies, an FM-RF amplifier and tuner for receiving FM signals over a different predetermined band of frequencies, power means connected to both tuning means to cause both to scan the bands, and relay stopping means associated with the power means to control the operation of the same; a first and a second IF amplifying section, the first connected to the AM-FM amplifier and tuner and the second IF amplifying section connected to the FM-RF amplifier and tuner, switching means interconnected between each IF amplifying section and its associated RF amplifier and tuner so they may be alternately connected to operate either for AM or FM operation, a transistorized trigger control circuit connected to both IF amplifying sections to be actuated by the one that is energized, said transistorized trigger control circuit connected to said relay stopping means to control the same for indexing on station whether AM or FM signals are being received, additional tuned means connected between the IF amplifying means for the FM portion and the transistorized trigger circuit to assist in the transfer of signal energy, and means for de-tuning this additional tuned means when the tuner is on station to prevent distortion.

7. In an AM-FM radio receiver having an AM-RF amplifier and tuner for receiving AM signals over a predetermined band of frequencies, an FM-RF amplifier and tuner for receiving FM signals over a different predetermined band of frequencies, power means connected to both tuning means to cause both to scan the bands and relay stopping means associated with the power means to control the operation of the same; a first and a second IF amplifying section, the first connected to the AM-RF amplifier and tuner and the second IF amplifying section connected to the FM-RF amplifier and tuner, switching means interconnected between each IF amplifying section and its associated RF amplifier and tuner so they may be alternately connected to operate either for AM or FM operation, a transistorized trigger control circuit connected to both IF amplifying sections to be actuated by the one that is energized, said transistorized trigger control circuit connected to said relay stopping means to control the same for indexing on station whether AM or FM signals are being received, an additional circuit tuned to the intermediate frequency connected between the IF amplifying means for the FM portion and the transistorized trigger control circuit to assist in the transfer of energy for signal stopping, a capacitative diode connected to the transistorized trigger circuit and to said additional circuit tuned to the IF to de-tune the additional circuit when the transistor trigger circuit operates to index on station to prevent distortion in the IF circuit connected to the FM-RF amplifier and tuner.

References Cited

UNITED STATES PATENTS 2,666,853 1/1954 O'Brien ---------- 325—470 XR

WILLIAM C. COOPER, *Primary Examiner.*

KATHLEEN H. CLAFFY, *Examiner.*

R. LINN, *Assistant Examiner.*